(12) United States Patent
Thakur et al.

(10) Patent No.: US 12,170,675 B2
(45) Date of Patent: Dec. 17, 2024

(54) EFFECTIVE PERMISSIONS FROM IAM (IDENTITY AND ACCESS MANAGEMENT) POLICIES

(71) Applicant: Veza Technologies, Inc., Los Gatos, CA (US)

(72) Inventors: Tarun Thakur, Los Gatos, CA (US); Maohua Lu, Fremont, CA (US)

(73) Assignee: Veza Technologies, Inc., Los Gatos, CA (US)

(*) Notice: Subject to any disclaimer, the term of this patent is extended or adjusted under 35 U.S.C. 154(b) by 284 days.

(21) Appl. No.: 17/689,104

(22) Filed: Mar. 8, 2022

(65) Prior Publication Data

US 2022/0286466 A1    Sep. 8, 2022

Related U.S. Application Data

(60) Provisional application No. 63/157,976, filed on Mar. 8, 2021.

(51) Int. Cl.
*G06F 21/78*    (2013.01)
*G06F 21/62*    (2013.01)
*H04L 9/40*    (2022.01)
*G06F 21/60*    (2013.01)

(52) U.S. Cl.
CPC .......... *H04L 63/105* (2013.01); *H04L 63/102* (2013.01); *H04L 63/104* (2013.01)

(58) Field of Classification Search
None
See application file for complete search history.

(56) References Cited

U.S. PATENT DOCUMENTS

| | | | |
|---|---|---|---|
| 9,436,502 B2* | 9/2016 | Burckhardt | G06F 16/27 |
| 11,722,526 B1* | 8/2023 | Shevrin | H04L 63/20 |
| 11,876,683 B2* | 1/2024 | Draznin | H04L 41/122 |
| 2012/0324529 A1* | 12/2012 | Rangachari | H04L 63/20 726/1 |
| 2017/0206701 A1* | 7/2017 | Agrawal | H04L 41/0893 |
| 2018/0210891 A1* | 7/2018 | Oliver | G06F 16/22 |
| 2022/0385668 A1* | 12/2022 | Simonetti | H04L 63/20 |

* cited by examiner

*Primary Examiner* — Venkat Perungavoor (57) ABSTRACT

The technology disclosed herein enables generation of effective permissions between principals and resources from access policies. In a particular embodiment, a method includes, in an effective permissions service, retrieving one or more access policies that define access permissions between a principal and a resource of the plurality of resources. The method also includes determining an effective permission defining the access of the principal to the resource based on the access policies and defining the effective permission in a canonical format. The method further includes storing the effective permission for reference when the principal attempts to access the resource.

14 Claims, 7 Drawing Sheets

EFFECTIVE PERMISSIONS FROM IAM (IDENTITY AND ACCESS MANAGEMENT) POLICIES

RELATED APPLICATIONS

This application is related to and claims priority to U.S. Provisional Patent Application 63/157,976, titled "EFFECTIVE PERMISSIONS FROM IAM (IDENTITY AND ACCESS MANAGEMENT) POLICIES," filed Mar. 8, 2021, which is hereby incorporated by reference in its entirety.

BACKGROUND

Modern enterprises use numerous data environments to store, manage, and/or process data and those environments may be managed by different systems, applications, and/or platforms from different providers and each may use its own data repository (e.g., database). For instance, different departments may employ different database systems depending on the features offered by the respective system (e.g., accounting may use a first database system while human resources uses a second). In some cases, a single department may itself use multiple platforms for data repositories depending on the capabilities of each platform even if the platforms manage similar data sets. For example, human resources may use one platform to onboard and terminate employees from the enterprise while another platform is used to handle employees' compensation and benefits. The repositories may be hosted local to the enterprise (i.e., at one or more of the enterprise's own facilities) or may be cloud based and hosted by third parties. Likewise, the cardinality of the data environments and the data therein can be very high (on the order of thousands of individual elements, such as data tables, to which a user can potentially access), which makes it very difficult to track which data can be accessed by which users.

SUMMARY

The technology disclosed herein enables generation of effective permissions between principals and resources from access policies. In a particular embodiment, a method includes, in an effective permissions service, retrieving one or more access policies that define access permissions between a principal and a resource of the plurality of resources. The method also includes determining an effective permission defining the access of the principal to the resource based on the access policies and defining the effective permission in a canonical format. The method further includes storing the effective permission for reference when the principal attempts to access the resource.

In some examples, the method includes receiving an access request for the principal to access the resource and determining whether to allow access to the principal based on the effective permission.

In some examples, the method includes identifying a changed access policy, determining that the changed access policy applies to the access of the principal to the resource, and determining an update to the effective permission based on the changed access policy.

In some examples, the canonical format indicates whether the principal has access to the resource with respect to one or more privileges in a group including data read, data write, metadata read, metadata write, and non-data.

In some examples, determining the effective permission includes processing the one or more policies in order of priority. A higher priority policy controls over a lower priority policy when the lower priority policy conflicts with the higher priority policy.

In some examples, an access policy of the access policies may be defined with respect to a node higher in a hierarchy than the resource. The access policy applies to all resources, including the resource, descending from the node in the hierarchy. In those examples, determining the effective permission may include traversing nodes in the hierarchy to identify those of the access policies that apply to the resource although are defined with respect to one or more higher level nodes.

In some examples, the method provides including the effective permission in a privilege graph with connections between the principal and a plurality of resources that include the resource. The connections indicate a plurality of effective permissions, which include the effective permission, for the plurality of resources.

In some examples, the method includes displaying the effective permission visually linking the principal and the resource. In those examples, the method may include receiving user input directing the effective permissions service to display the one or more access policies.

An apparatus is provided having one or more computer readable storage media and a processing system operatively coupled with the one or more computer readable storage media. Program instructions stored on the one or more computer readable storage media that, when read and executed by the processing system, direct the apparatus to retrieve one or more access policies that define access permissions between a principal and a resource of a plurality of resources. The program instructions further direct the apparatus to determine an effective permission defining the access of the principal to the resource based on the access policies and define the effective permission in a canonical format. The program instructions also direct the apparatus to store the effective permission for reference when the principal attempts to access the resource.

DETAILED DESCRIPTION

Permissions are used widely in authorization (AuthZ) systems to represent that a principal (user, group, service account) has certain accesses to a resource. For example, one IAM (Identity and Access Management) user on a cloud service platform may list all IAM policies within the cloud service account. In this case, the principal is the IAM user, the resource is IAM policies within the account, and the permission is "ListAllIAMPolicy". However, various AuthZ systems have complicated features that make it difficult to figure out the "effective permission" that a principal can apply to the corresponding resource. For many platforms, IAM policies are the constructs that encode the authorization information. In those examples, the complicated features include Deny, Service Control Policy (SCP), and permission boundary, among many other features. For example, one IAM policy can specify that UserA has "ListObject" permission on a particular bucket Bucket1, but another policy can specify that all users with UserA's title are denied access to Bucket1. At the end of day, UserA cannot "ListObject" on Bucket1 at all because the effective permission for UserA to access Bucket1 is empty (no permission at all due to the deny policy taking precedence).

In summary, an effective permission herein is the permission that takes effect between a principal (a user, group or an IAM role) and a resource. The effective permission follows a canonical permission model to map concrete privileges from identified IAM policies into 5 abstract privileges: 1) Data Read, 2) Data Write, 3) Metadata Read, 4) Metadata Write, and 5) Non-Data. By mapping concrete privileges into these 5 abstract categories, people can understand very quickly what privileges they have for each resource without going through all detailed privileges.

Determining the effective permissions is advantageous for customers because the effective permission is the controlling answer the question of "who has access to what". Without the effective permissions, it is hard to answer the question of "who has access to what" as a single IAM policy or a subset of IAM policies do not necessarily give an accurate picture of all permissions for a principal (a user, group or role) on a particular resource. Thus, one cannot be sure of "who has access to what" without going through all permissions.

Also, the effective permissions represent controlling privileges as human-understandable permissions, which removes "noise" (i.e., privileges that do not apply/control) that a human user would encounter when reviewing privileges set forth in the IAM policies.

Another advantage of calculating and maintaining (e.g., storing) effective permissions concerns the relatively high cost of performing the "effective permission" computation, which make computing effective permissions "on the fly" difficult and less efficient. For example, to compute the effective permissions of a user inside a cloud service account with a service control policy (SCP), one has to apply the SCP logic each time the user attempts to access a resource. Applying the SCP logic each time means that a computing system has to traverse the underlying persistence layer (for example, a graph data base), which is not cost effective at all in terms of computing resources. Instead, the technology herein computes the effective permissions once so that they can be referenced many times during future access attempts. The effective permission would be re-computed when the underlying policies have changed to ensure the effective permission still represents the controlling permission.

There are steps to build effective permissions. These three steps are general for all cloud providers that have IAM policies. In some cloud service providers, there are six considerations in computing effective permissions from IAM policies: 1) Identity-Based vs. Resource-Based policies (i.e., policies that are defined from the perspective of the principal identity vs policies that are defined from the perspective of the resource). 2) Allow Statements (i.e., permissions that are defined from the perspective of allowing access). 3) Deny Statements (i.e., permissions that are defined from the perspective of denying access). 4) Conditional Statements (i.e., permissions that allow or deny access based on conditions of resource). 5) Permission Boundaries (i.e., permissions that allow or deny access based on conditions of the principal). 6) Organizational SCPs (i.e., access limits across all principals in an organization).

After computing effective permissions, the effective permissions are mapped to canonical permissions based on the canonical permission model. Preferably there are five canonical privileges: 1) Data Read, 2) Data Write, 3) Metadata Read, 4) Metadata Write, and 5) Non-Data. Whenever there is a change in IAM policies, only the affected effective permissions are re-computed. That is, effective permissions related to principals and resources that are associated with the changed IAM policies are re-computed while other effective permissions are not. Although the effective permissions are formatted as canonical permissions, if a user wants to know the policies that lead to an effective permission, the user may expand a displayed effective permission to reveal the IAM policies between the corresponding principal and resource.

Figure 1:
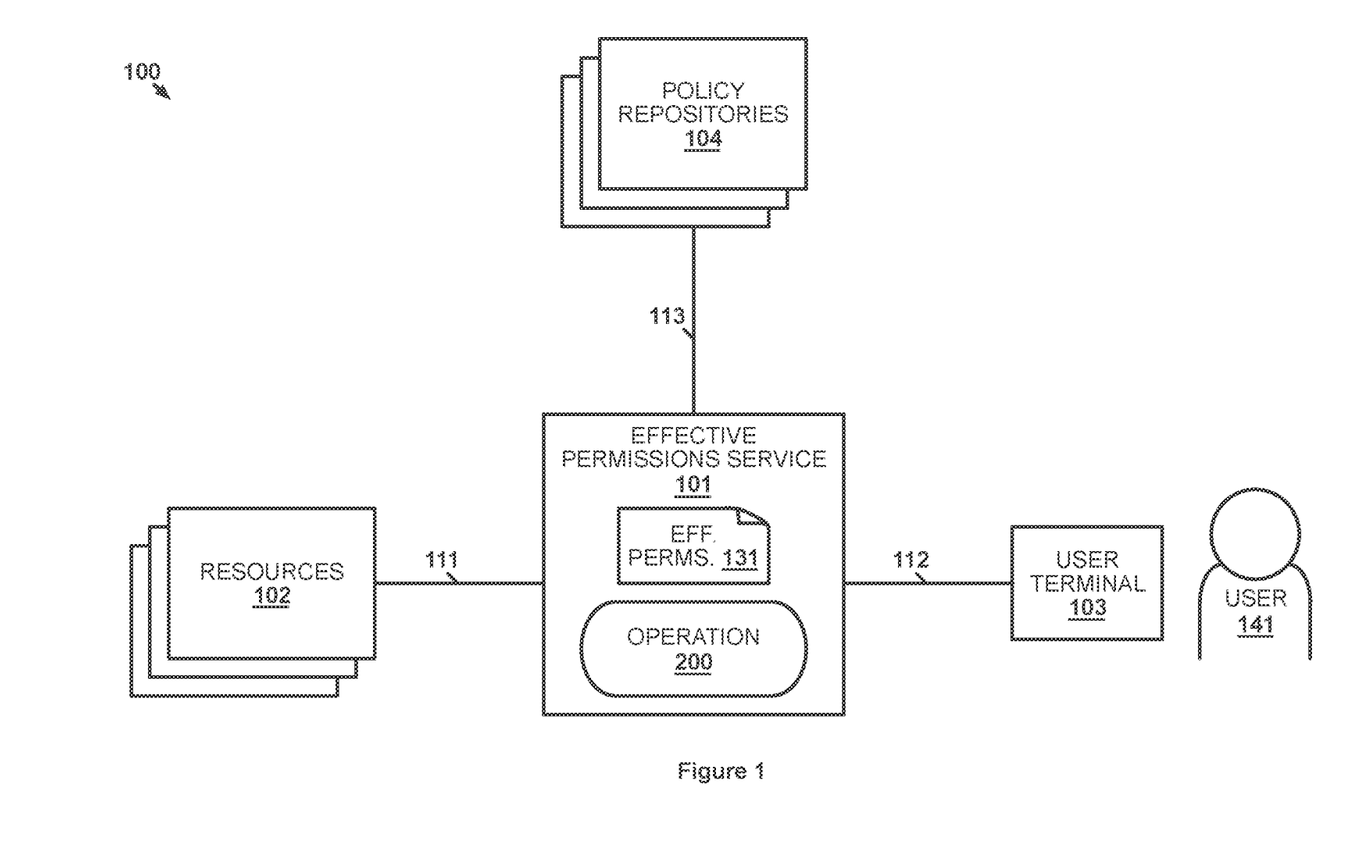
FIG. 1 illustrates an implementation for creating, maintaining, and implementing effective permissions for IAM policies.

FIG. 1 illustrates implementation 100 for creating, maintaining, and implementing effective permissions for IAM policies. Implementation 100 includes effective permissions service 101, resources 102, user terminal 103, and policy repositories 104. Effective permissions service 101 and resources 102 communicate over respective communication links 111. Effective permissions service 101 and user terminal 103 communicate over communication link 112. Effective permissions service 101 and policy repositories 104 communicate over respective communication links 113. While communication links 111-113 are shown as direct links, communication links 111-113 may include intervening systems, networks, and/or devices. Similarly, though not shown, communication links may exist between resources 102, policy repositories 104, and/or user terminal 103. Effective permissions service 101 executes on one or more computing systems, such as server systems, having processing and communication circuitry to operate as described below. User terminal 103 is a user operated computing system, such as a desktop workstation, laptop, tablet computer, smartphone, etc., that user 141 uses to access data environments 102. Resources 102 includes one or more computer-based resources that a principal may access, such as databases, files, applications, or some other computing resource. Policy repositories 104 include one or more storage systems that store IAM policies between principals and respective resources of resources 102. In some examples, one or more of policy repositories 104 are included in effective permissions service 101. In other examples, policy repositories 104 and resources 102 may be implemented using the same computing systems (e.g., those of a cloud service platform).

Figure 2:
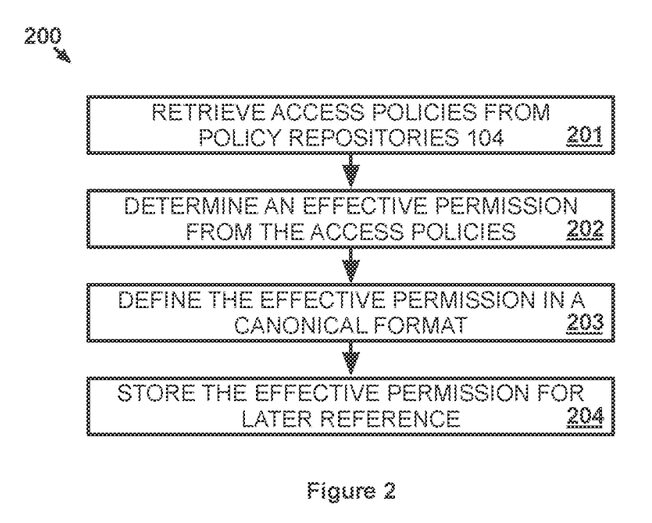
FIG. 2 illustrates an operation for creating, maintaining, and implementing effective permissions for IAM policies.

FIG. 2 illustrates operation 200 for creating, maintaining, and implementing effective permissions for IAM policies. Operation 200 is performed by effective permissions service 101 to generate effective permissions from policies in policy repositories 104. Specifically, effective permissions service 101 retrieves one or more access policies that define access permissions between a principal and a resource of resources 102 (201). In this example, the principal is user 141, although, other types of principals are handled in the same manner.

Effective permissions service 101 determines an effective permission defining the access of user 141 to the resource based on the access policies (202). Any known method of determining an effective permission may be used by effective permissions service 101. In general, the method used by effective permissions service 101 to determine the effective permission will direct effective permissions service 101 to process the policies by order of priority, where higher priority policies control when a conflict exists with lower priority policies. The resulting effective permission is, therefore, based on one or more controlling policies while ignoring those policies that are overshadowed by a higher priority policy.

Effective permissions service 101 further defines the effective permission in a canonical format (203). The permissions resulting from the various policies in policy repositories 104 may be formatted differently. While there may not be anything about any of the policy formats that makes it difficult to understand the permissions represented thereby, it is easier to store, review, categorize, or otherwise process permissions that share a common format. As such, effective permissions service 101 uses a canonical format for the determined effective permission and for all other effective permissions in effective permissions 131. The canonical format may simplify the permission definitions down to one of the five categories mentioned above (i.e., Data Read, Data Write, Metadata Read, Metadata Write, and Non-Data).

Once defined in the canonical format, effective permissions service 101 stores the effective permission in effective permissions 131 for reference when user 141 attempts to access the resource (204). For example, user 141 may operate user terminal 103 in a manner that directs user terminal 103 to attempt access to the resource. Upon effective permissions service 101 receiving an access request from user terminal 103, effective permissions service 101 simply references the effective permission from within effective permissions 131 to determine whether user 141 is authorized to access the resource.

The above steps of operation 200 may repeat, or be performed in parallel, to determine effective permissions for user 141 to access other resources of resources 102 so that those effective permissions can also be stored in effective permissions 131. Likewise, the above steps may be performed to determine, and store with effective permissions 131, effective permissions regarding other principals' access to resources 102.

In some examples, effective permissions service 101 may enable a user to view effective permissions 131 via a user terminal connected to effective permissions service 101. The user may be able to request a display of the effective permissions for any one principal or group of principals with respect to one or more of resources 102. Since the effective permissions are in the canonical format, the permissions are displayed in a consistent manner regardless of the resource involved.

Figure 3:
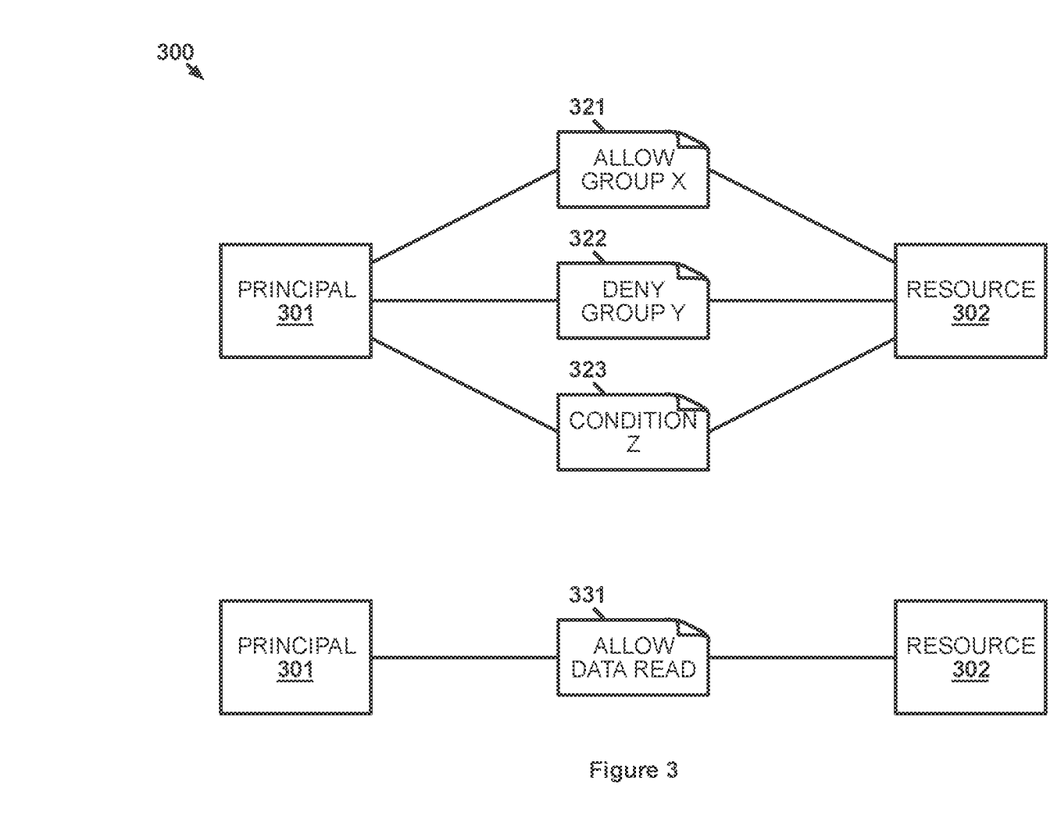
FIG. 3 illustrates an operational scenario for creating, maintaining, and implementing effective permissions for IAM policies.

FIG. 3 illustrates operational scenario 300 for creating, maintaining, and implementing effective permissions for IAM policies. Operational scenario 300 illustrates a set of policies 321-323 between a principal 301 and resource 302 of resources 102. Policies 321-323 are retrieved by effective permissions service 101 in accordance with operation 200. Effective permissions service 101 processes policies 321-323 to determine which policy controls regarding whether principal 301 is allowed to access resource 302. In this example, policy 321 allows all access to principals in group X while policy 322 denies access to principals in group Y. Since principal 301 is a member of both groups, effective permissions service 101 determines that policy 321 has priority over policy 322. Effective permissions service 101 also identified policy 323 that places a condition Z on principal 301's access of resource 302. In this case, the condition Z takes precedence over policy 321 and limits principal 301's access to read only.

Consequently, effective permissions service 101 determines that the effective permission 331 between principal 301 and resource 302 is to allow principal 301 to read data from resource 302. Should effective permissions service 101 receive a request from principal 301 to read data from resource 302, effective permissions service 101 will reference effective permission 331 to determine that the request should be allowed. Alternatively, should effective permissions service 101 receive a request from principal 301 to write data to resource 302, effective permissions service 101 will reference effective permission 331 to determine that the request should be denied. In both of the above examples, effective permissions service 101 does not need to reprocess policies 321-323 to determine how to handle the requests.

Figure 4:
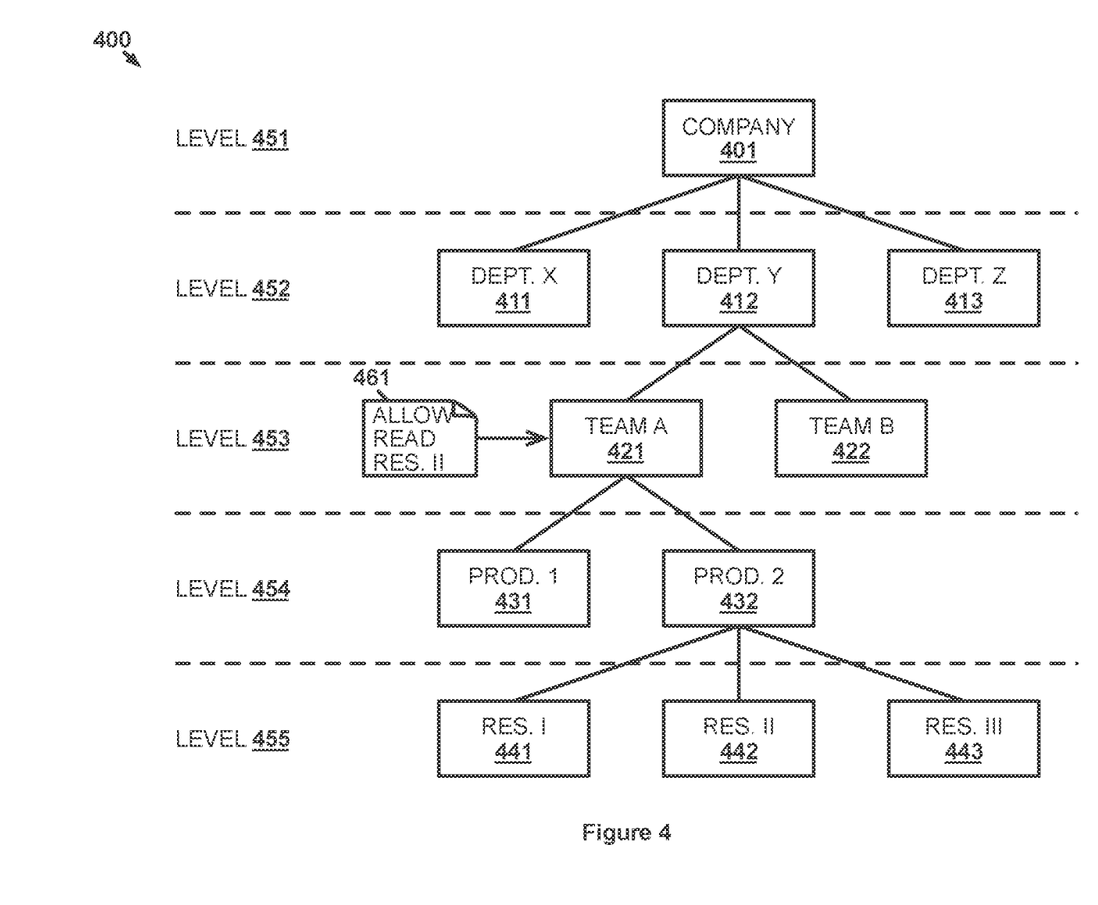
FIG. 4 illustrates an organizational hierarchy for creating, maintaining, and implementing effective permissions for IAM policies.

FIG. 4 illustrates organizational hierarchy 400 for creating, maintaining, and implementing effective permissions for IAM policies. Organizational hierarchy 400 is an example hierarchy that organizes principles (e.g., user 141 and principal 301) within an organization. Organizational hierarchy 400 is divided into five levels. Level 451 is the top level followed by level 452, level 453, and level 454 in sequence before reaching level 455 at the bottom of organizational hierarchy 400. Level 451 includes a root node 401 representing the company (i.e., organization) as a whole. Level 452 includes nodes 411-413 representing departments X, Y, and Z, within the company. Level 453 includes nodes 421-422 representing teams A and B within department Y. Level 454 includes nodes 431-432 representing products 1 and 2 being handled by team A. Level 455 includes nodes 441-443 representing resources I, II, and III that principals may be allowed to access. While only one node at each of levels 451-455 is shown to have branches to nodes in a subsequent level, it should be understood that other nodes may branch to lower levels as well (and likely do).

Access policies from one or more of policy repositories 104 that apply to a node in organizational hierarchy 400 apply to all principals that are encompassed by that node. For instance, in this example, access policy 461 applies to team A, which is represented by node 421. Specifically, access policy 461 indicates that principals in team A are allowed to access resource II, which is represented by node 442. In some examples, the level in which a node exists in organizational hierarchy 400 may indicate precedence of access policies that apply to that node relative to children or ancestors of the node. For example, another access policy may apply to node 432 that indicates data read access to resource II is not allowed by principals assigned to product 2. If access policies that apply in level 454 are given higher priority by effective permissions service 101 than those that apply in level 453, then principals assigned to product 2 are not allowed data read access to resource II (i.e., effective permissions for those principals indicates that data read access is allowed) even though access policy 461 indicates that they do have access. In contrast, if level 453 access policies are given higher priority, then the other rule that applies to product 2 would be overshadowed by access policy 461 and principals assigned to product 2 will by allowed access by effective permissions service 101.

Figure 5:
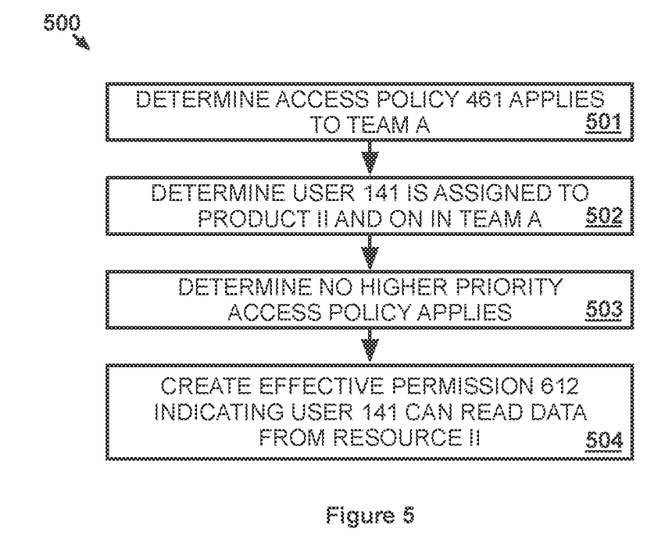
FIG. 5 illustrates an operation for creating, maintaining, and implementing effective permissions for IAM policies.

FIG. 5 illustrates operation 500 for creating, maintaining, and implementing effective permissions for IAM policies. Operation 500 is an example of steps effective permissions service 101 may perform to generate an effective permission based on organizational hierarchy 400. During operation 500, effective permissions service 101 retrieves access policy 461 from policy repositories 104 and determines that access policy 461 applies to principals in team A (501). Effective permissions service 101 further determines that user 141 is one of the principals in team A (502). Organizational hierarchy 400 itself may indicate the principals encompassed by each node or effective permissions service 101 may reference another source. For instance, a human resources database may indicate which principals are included in which teams to determine that user 141 is included in team A.

Effective permissions service 101 traverses the branches of organizational hierarchy 400 from node 421 to node 442 to identify other higher priority access policies, if any, that may take precedence over access policy 461. In this case, effective permissions service 101 determines that no higher priority policy, whether higher or lower in organizational hierarchy 400, overrides access policy 461 (503). Since no higher priority policy has been found, effective permissions service 101 creates effective permission 612 indicating that user 141 is allowed to read data from resource II (504). After creating effective permission 612, effective permissions service 101 can display effective permission 612 to a user, such as a system administrator, to clearly indicate that user 141 has permission to read data from resource II. The user would, therefore, not need to parse all access policies themselves (if even practical to do) to determine whether user 141 can access resource II. Likewise, should effective permissions service 101 receive a request asking whether user 141 can read data from resource II, effective permissions service 101 need only reference effective permission 612 and does not need to parse through all access policies on the fly to provide a response.

Should an access policy change occur with respect to organizational hierarchy 400 that could affect access policy 461's application, the effective permissions service 101 will reprocess the access policies of organizational hierarchy 400 to determine whether the change affects effective permission 612. For instance, an access policy change (e.g., additional policy, modified policy, removed policy, etc.) that applies to department Y could result in an access policy that takes priority over access policy 461 and cause a change to, or removal of, effective permission 612.

While operation 500 only discusses the creation of a single effective permission from a single access policy, effective permissions service 101 may process all access policies that apply to organizational hierarchy 400 to generate effective permissions for all principals and resources to which organizational hierarchy 400 applies.

Figure 6:
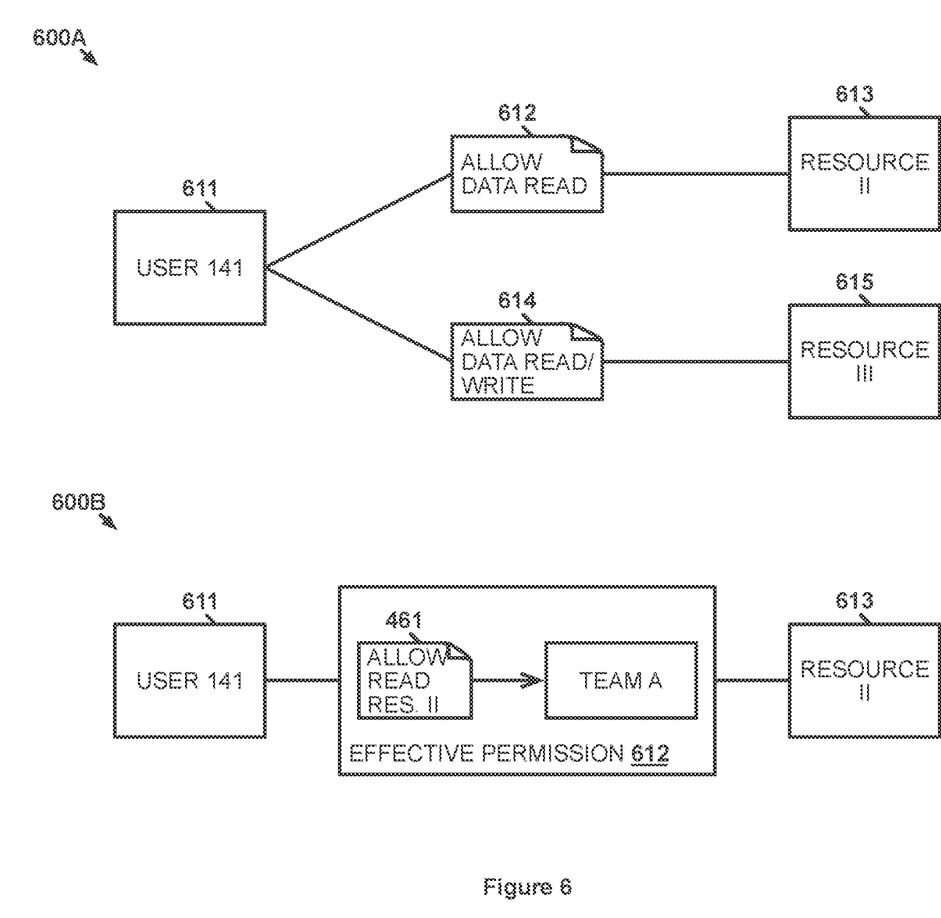
FIG. 6 illustrates privilege graphs for creating, maintaining, and implementing effective permissions for IAM policies.

FIG. 6 illustrates privilege graph 600A and privilege graph 600B for creating, maintaining, and implementing effective permissions for IAM policies. Privilege graph 600A is a graph that illustrates to a user the effective permissions from the perspective of user 141, who is represented by user 141 node 611. Privilege graph 600A may be displayed through a display interface of effective permissions service 101 or may be displayed by effective permissions service 101 via a user system in communication with effective permissions service 101. In this example, two effective permissions are applicable to user 141, effective permission 612 and effective permission 614. Effective permission 612, as discussed above, indicates that user 141 is allowed data read access to resource II, which is represented by resource II node 613 in privilege graph 600A. Effective permission 614 is another effective permission of user 141 that effective permissions service 101 may have generated by performing an operation similar to operation 500 above. Effective permission 614 indicates that user 141 is allowed both data read and data write access to resource III, which is represented by resource III node 615 in privilege graph 600A.

Privilege graph 600A may be a subset of nodes from a larger privilege graph that covers other, if not all, principals and resources in the company. For instance, a user may indicate that they want to see the effective permissions for user 141 only and privilege graph 600A may be displayed by effective permissions service 101 in response to that request. In an alternative example, the user may request that effective permissions be displayed with respect to resource II. In that case, the privilege graph presented by effective permissions service 101 may show all the effective permissions that affect access to resource II and the principals and/or groups of principals (e.g., Team A), to which those effective permissions apply.

In this example, the user to which privilege graph 600A is displayed requests that effective permissions service 101 display information about effective permission 612. For example, the user may double click on effective permission 612 in privilege graph 600A, may right click and select "more information," or the like, from a menu that displays responsive to the click, or may otherwise indicate through user input (received directly through a user interface of effective permissions service 101 or via a user system operated by the user) that more information is requested. Effective permissions service 101 (either itself or through a user system) displays privilege graph 600B. Privilege graph 600B focuses on effective permission 612 and illustrates that access policy 461's application to team A resulted in effective permission 612. By displaying effective permission 612 in the manner of privilege graph 600B to the user, the user can easily determine what the cause is for user 141 having data read access to resource II. The user may then know to change access policy 461, or create a higher priority access policy, to change user 141's access privileges with respect to resource II.

Figure 7:
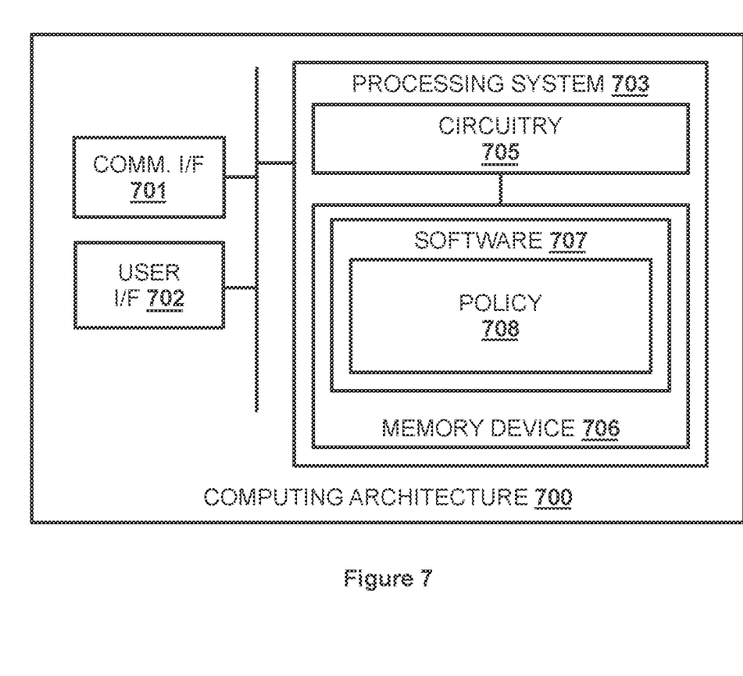
FIG. 7 illustrates a computing architecture for creating, maintaining, and implementing effective permissions for IAM policies.

FIG. 7 illustrates computing architecture 700 for creating, maintaining, and implementing effective permissions for IAM policies. Computing architecture 700 is an example computing architecture for implementing effective permissions service 101. A similar architecture may also be used for other systems described herein, such as user terminal 103, although alternative configurations may also be used. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a computer readable storage medium, such as a disk drive, flash drive, data storage circuitry, or some other memory apparatus. In no examples would a computer readable storage medium of memory device 706, or any other computer readable storage medium herein, be considered a transitory form of signal transmission (often referred to as "signals per se"), such as a propagating electrical or electromagnetic signal or carrier wave. Operating software 707 comprises computer programs, firmware, or some other form of machine-readable processing instructions. Operating software 707 includes access policy module 708. Operating software 707 may further include an operating system, utilities, drivers, network interfaces, applications, or some other type of software. When executed by processing circuitry 705, operating software 707 directs processing system 703 to operate computing architecture 700 as described herein.

In particular, policy module 708 directs processing system 703 to retrieve one or more access policies that define access permissions between a principal and a resource of a plurality of resources. Policy module 708 further directs processing system 703 to determine an effective permission defining the access of the principal to the resource based on the access policies and define the effective permission in a canonical format. Also, policy module 708 directs processing system 703 to store the effective permission for reference when the principal attempts to access the resource.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   in an effective permissions service:
      retrieving one or more access policies that define access permissions between a principal and a resource of a plurality of resources;
      determining an effective permission defining the access of the principal to the resource based on the access policies, including processing the one or more policies in order of priority, wherein a higher priority policy controls over a lower priority policy when the lower priority policy conflicts with the higher priority policy;
      defining the effective permission in a canonical format;
      storing the effective permission for reference when the principal attempts to access the resource;
      including the effective permission in a privilege graph with connections between the principal and a plurality of resources that include the resource, wherein the connections indicate a plurality of effective permissions, which include the effective permission, for the plurality of resources;
      identifying a changed access policy;
      determining that the changed access policy applies to the access of the principal to the resource; and
      determining an update to the effective permission based on the changed access policy.

2. The method of claim 1, comprising:
   receiving an access request for the principal to access the resource; and
   determining whether to allow access to the principal based on the effective permission.

3. The method of claim 1, wherein the canonical format indicates whether the principal has access to the resource with respect to one or more privileges in a group comprising:
   data read;
   data write;
   metadata read;
   metadata write; and
   non-data.

4. The method of claim 1, wherein an access policy of the access policies is defined with respect to a node higher in a hierarchy than the resource, wherein the access policy applies to all resources, including the resource, descending from the node in the hierarchy.

5. The method of claim 4, wherein determining the effective permission comprises:
   traversing nodes in the hierarchy to identify those of the access policies that apply to the resource although are defined with respect to one or more higher level nodes.

6. The method of claim 1, comprising:
   displaying the effective permission visually linking the principal and the resource.

7. The method of claim 6, comprising:
   receiving user input directing the effective permissions service to display the one or more access policies.

8. An apparatus comprising:
   one or more computer readable storage media;
   a processing system operatively coupled with the one or more computer readable storage media; and
   program instructions stored on the one or more computer readable storage media that, when read and executed by the processing system, direct the apparatus to:
      retrieve one or more access policies that define access permissions between a principal and a resource of a plurality of resources;
      determine an effective permission defining the access of the principal to the resource based on the access policies, including processing the one or more policies in order of priority, wherein a higher priority policy controls over a lower priority policy when the lower priority policy conflicts with the higher priority policy;
      define the effective permission in a canonical format;
      store the effective permission for reference when the principal attempts to access the resource;
      include the effective permission in a privilege graph with connections between the principal and a plurality of resources that include the resource, wherein the connections indicate a plurality of effective permissions, which include the effective permission, for the plurality of resources;
      identify a changed access policy;
      determine that the changed access policy applies to the access of the principal to the resource; and
      determine an update to the effective permission based on the changed access policy.

9. The apparatus of claim 8, wherein the program instructions direct the processing system to:

receive an access request for the principal to access the resource; and determine whether to allow access to the principal based on the effective permission.

10. The apparatus of claim 8, wherein the canonical format indicates whether the principal has access to the resource with respect to one or more privileges in a group comprising:
- data read;
- data write;
- metadata read;
- metadata write; and
- non-data.

11. The apparatus of claim 8, wherein an access policy of the access policies is defined with respect to a node higher in a hierarchy than the resource, wherein the access policy applies to all resources, including the resource, descending from the node in the hierarchy.

12. The apparatus of claim 11, wherein to determine the effective permission, the program instructions direct the apparatus to:

traverse nodes in the hierarchy to identify those of the access policies that apply to the resource although are defined with respect to one or more higher level nodes.

13. The apparatus of claim 8, wherein the program instructions direct the processing system to:

display the effective permission visually linking the principal and the resource; and receive user input directing the apparatus to display the one or more access policies.

14. One or more computer readable storage media having program instructions stored thereon that, when read and executed by a processing system, direct the processing system to:

retrieve one or more access policies that define access permissions between a principal and a resource of a plurality of resources;

determine an effective permission defining the access of the principal to the resource based on the access policies, including processing the one or more policies in order of priority, wherein a higher priority policy controls over a lower priority policy when the lower priority policy conflicts with the higher priority policy;

define the effective permission in a canonical format;

store the effective permission for reference when the principal attempts to access the resource;

include the effective permission in a privilege graph with connections between the principal and a plurality of resources that include the resource, wherein the connections indicate a plurality of effective permissions, which include the effective permission, for the plurality of resources;

identify a changed access policy;

determine that the changed access policy applies to the access of the principal to the resource; and determine an update to the effective permission based on the changed access policy.

\* \* \* \* \*